US006819323B2

(12) United States Patent
Sunaga

(10) Patent No.: US 6,819,323 B2
(45) Date of Patent: Nov. 16, 2004

(54) STRUCTURE AND METHOD FOR GAINING FAST ACCESS TO PIXEL DATA TO STORE GRAPHIC IMAGE DATA IN MEMORY

(75) Inventor: Toshio Sunaga, Ohtsu (JP)

(73) Assignee: International Business Machines Corporation, Armonk, NY (US)

( * ) Notice: Subject to any disclaimer, the term of this patent is extended or adjusted under 35 U.S.C. 154(b) by 375 days.

(21) Appl. No.: 09/790,764

(22) Filed: Feb. 22, 2001

(65) Prior Publication Data

US 2001/0017628 A1 Aug. 30, 2001

(30) Foreign Application Priority Data

Feb. 28, 2000 (JP) ...................................... 2000-050412

(51) Int. Cl.[7] .................................................. G06T 1/60

(52) U.S. Cl. .............................. 345/530; 710/1; 710/3; 710/5

(58) Field of Search ................................ 345/530, 531, 345/501, 502, 503, 520; 710/1, 2, 3, 5, 7; 711/5, 202, 149

(56) References Cited

U.S. PATENT DOCUMENTS 5,161,221 A * 11/1992 Van Nostrand ............. 711/157
5,260,789 A * 11/1993 Okamoto .................... 348/500
5,818,788 A * 10/1998 Kimura et al. ......... 365/230.03
6,055,194 A * 4/2000 Seo et al. .................. 365/194
6,223,266 B1 * 4/2001 Sartore ....................... 711/170
6,262,940 B1 * 7/2001 Choi et al. .................. 365/233
6,396,763 B1 * 5/2002 Orii ...................... 365/230.03
6,411,334 B1 * 6/2002 Yeh et al. .................. 348/445
6,466,219 B1 * 10/2002 Shino ......................... 345/531
6,510,537 B1 * 1/2003 Lee ............................ 714/763

* cited by examiner

*Primary Examiner*—Matthew C. Bella
*Assistant Examiner*—Mackly Monestime
(74) *Attorney, Agent, or Firm*—H. Daniel Schnurmann

(57) ABSTRACT

A memory chip having fast access to pixel data of graphics image to be stored therein is described. The memory chip consists of data inputs and outputs (I/Os) divided into a plurality of blocks; memory arrays for storing data received from or sent to the I/Os, which are divided into the same number of blocks as the I/Os; and address input terminals for specifying addresses to be accessed by respective blocks of the memory arrays, which are divided into the same number of blocks as the memory arrays. The memory chip and the method for storing data enable reading data in a vertical line, in a diagonal line, and the like, at the same access speed as data in a horizontal line is being read. Furthermore, power consumption of the chip is significantly reduced, and the wiring arrangement of the I/Os is greatly simplified.

6 Claims, 15 Drawing Sheets

STRUCTURE AND METHOD FOR GAINING FAST ACCESS TO PIXEL DATA TO STORE GRAPHIC IMAGE DATA IN MEMORY

FIELD OF THE INVENTION

The present invention is generally related to semiconductor memories and data storage and, more particularly, to an image memory chip and a method for storing image data.

BACKGROUND AND PRIOR ART

Presently, synchronous dynamic random access memories (SDRAM) with a large bandwidth have come to the forefront as a leading type of memory. More specifically, the data volume per pixel has increased manifold since multiple-color images and three-dimensional images have become more common in image memories. Thus, for many applications, SDRAMs are now the preferred vehicle to process high volumes of data at high speed.

In order to facilitate the understanding of the invention and put it in the proper perspective, a conventional dynamic random access memory (DRAM) will first be considered for comparison purposes. In DRAMs, the read and write accesses to a cell are executed by specifying a row address (word line) and a column address (bit line) of the memory cells that are typically arranged in a matrix formation. When the row address of a target memory cell is specified, data on the word line related to the designated address is latched to sense amplifiers. When the column address is specified, data in the column address is selected from that already latched into the sense amplifiers and transferred to the output drivers. Since data of the designated row address is coupled to sense amplifiers, only data on the same word line can be continuously read by specifying the column addresses. In a page mode, wherein data of the same row address is continuously addressed, there is no need to respecify the row address in order to achieve a high speed data access.

In a synchronous DRAM (hereinafter referred to as SDRAM), when the row and column addresses of a first data are specified, any addresses that follow are automatically generated within the memory chip such that the data appearing at the output drivers is continuously in synchronization with the clock. Burst lengths of 2, 4, 8, and 16 can be selected as the most suited data rate for a continuous transmission. In burst mode, wherein data is accessed in synchronization with the clock, data is read at every clock cycle. Thus, a faster access may be achieved than the previously described page mode.

The burst mode of the SDRAM is essentially the same as the conventional page mode, except that the data is accessed in synchronization with the clock signal. Accordingly, a faster access can be achieved by selecting only the first column address from a number of sense amplifiers activated by the single row address. Thus, when the same row address is specified, a fast read operation is obtained. However, when a different row address is designated, the reading speed is drastically reduced because new data must be latched to the sense amplifiers.

In order to improve the access speed for different row addresses, an SDRAM typically is structured in a plurality of memory banks operating separately from each other. For example, while one bank is being accessed, another bank can be activated or precharged in order not to delay the data transmission.

FIG. 12 shows an example of a typical memory chip organization in a SDRAM. Memory chip 90 consists of four banks, common data I/Os (inputs/outputs), and common address inputs. By way of example, memory chip 90 is a 64 Mb chip (2 Mb) with 32 I/Os. Twenty-one address lines are required to specify one of 2 M ($=2^{21}$) addresses. In many instances, for a time-shared row and column addressing arrangement, half the number of address lines (i.e., 11) is required to specify the 2 M addresses. When inputting an address, data can be read or written via the 32 I/O terminals.

In image display memory devices, a display screen is scanned from top to bottom on a line-by-line basis. Accordingly, pixels aligned in a horizontal line are mapped into memory in such a manner that a faster access to the pixel data can be achieved. More specifically, as shown in FIG. 13(*a*), pixel data aligned in a horizontal line is mapped into memory such that it can be stored in the same word line (i.e., the same row address). Memory mapping makes it possible to read at high speed the pixel data that is aligned in a row in the scanning direction.

FIG. 13(*b*) is a detailed memory map diagram of the pixel's data. In this figure, there is shown in graphic image 92, PIX (m, n), a pixel in the $m^{th}$ row from the top and the $n^{th}$ column from the left end, where m and n are integers ranging from 0 to 3. Four pixels aligned in the top horizontal line are stored in the same word line of bank 0. Similarly, four pixels aligned in the second, third, and fourth horizontal lines from the top are stored in the same word lines of bank 1, bank 2 and bank 3, respectively. If the pixel consists of 64 bits, the pixel's data can be read in a 2-bit burst operation (since the number of I/O terminals is 32).

FIG. 14 is a schematic block diagram showing the interconnections linking four groups of 8 I/Os and four banks 0, 1, 2, and 3. FIG. 15(*a*) shows the memory mapping as it relates to the four groups of 8 I/Os and the four banks. Each block labeled S0, S1, S2, S3, S4, S5, S6, S7, S8, S9, S10, S11, S12, S13, S14 and S15 indicates an 8-bit burst of data. S0, S4, S8 and S12 represent the data in bank 0; S1, S5, S9 and S13, data in bank 1; S2, S6, S10 and S14 data in bank 2; and S3, S7, S11 and S15, data in bank 3. When data of the four pixels in the top horizontal line is read, pixel PIX(0, 0) is extracted from the first and second bits of 8-bit burst of data S0, S4, S8, and S12 in bank 0, as shown in FIG. 15(*b*). In the same manner, pixels PIX(0, 1), PIX(0, 2), and PIX(0, 3) are obtained from the third and fourth bits, the fifth and sixth bits, and the seventh and eighth bits, respectively. In this manner, when data of four horizontal pixels is read, an 8-bit burst length is selected to read data from each bank. When data of four pixels arranged in a 2 by 2 formation is read, a 4-bit burst length is selected to read data from two banks. For example, when data in the four pixels located in the upper left corner of FIG. 15(*c*) is read, pixels PIX(0, 0) and PIX(0, 1) are obtained from the 4-bit burst data of S0, S4, S8, and S12 in bank 0. In the same manner, pixels PIX(1, 0) and PIX(1, 1) are obtained from the 4-bit burst data S1, S5, S9, and S13 in bank 1. When data of four vertical pixels is read, a 2-bit burst length is selected to read data from four banks.

To change the burst length, the memory chip must be in standby mode to successfully suspend the data transmission. In order to resume the data transmission, a word line needs to be reactivated. Thus, changing the burst length lowers the data rate. When data in the pixels in a vertical line or in a diagonal line is accessed, the access speed becomes slower than that of accessing data of a horizontal pixel line. When a plurality of banks is accessed, power consumption increases significantly because the word lines of each bank are activated. For example, to access a horizontal pixel line, only one bank needs to be accessible. On the other hand, in order to access a vertical pixel line, four banks are required, in which case, the power consumption increases fourfold. A multiple bank structure complicates the design of the memory and increases the production cost. Furthermore, as shown in FIG. 14, it further requires extended wiring and complex interconnections between the banks and the I/O terminals.

Objects of the Invention

It is an object of the present invention to provide a memory chip having fast access to pixel data for graphic image stored in the memory.

It is a further object to provide a method for storing image data for graphic imaging.

SUMMARY OF THE INVENTION

In a first aspect of the invention, there is provided a memory chip that includes data input/output terminals (I/Os) divided into a plurality of blocks; memory arrays divided into the same number of blocks as the data I/Os to store data received from or sent to respective data I/Os; and means for specifying addresses for writing data received from data I/Os and for reading data sent to data I/Os in each block. In such a memory chip, the means for specifying addresses specifies an address in each block of memory arrays and the specified data can be sent to each data I/O. In a like manner, data received from each data I/O can be stored in the specified address of each block.

In a second aspect of the invention, there is provided a method for storing data storage that includes the steps of: specifying a write address of data received from data I/Os divided into a plurality of blocks; and writing data received from each data I/O into each specified address of the memory arrays.

The memory chip and the method for storing data according to the present invention make it possible to read data in a vertical line, in a diagonal line, and the like at the same access speed as reading data in a horizontal line. In addition, the power consumption of the chip is significantly reduced, and the wiring arrangement of the I/Os is greatly simplified.

BRIEF DESCRIPTION OF THE DRAWINGS

The present invention will be understood more fully from the detailed description given below and from the accompanying drawings of the preferred embodiment of the invention which, however, should not be taken to limit the invention to the specific embodiment, but are for explanation and understanding only.

DETAILED DESCRIPTION OF THE INVENTION

The memory chip and the method for storing data with that memory chip will now be described in detail. In the following description, numerous details are set to provide a thorough understanding of the invention. It will be evident, however, to one skilled in the art that the invention may be practiced without these specific details. In other instances, well-known operations have nor been described in detail to avoid unnecessarily obscuring the present invention.

In the preferred embodiment, a 64 Mb memory chip with 32 I/Os is provided for illustrative purposes. Reading data will be described in this embodiment in detail, but writing of data can also be conduced in a similar manner.

Figure 1:
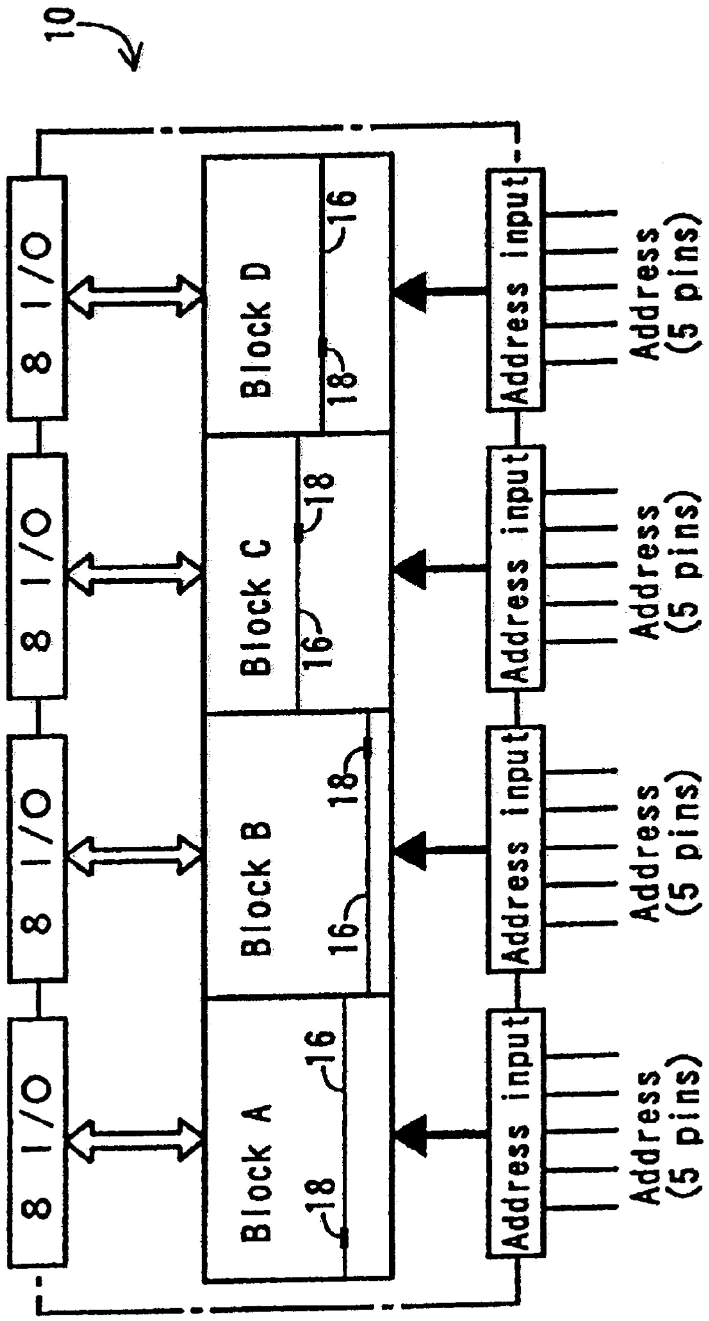
FIG. 1 is a block diagram showing an example of a memory chip organization according to the present invention.

FIG. 1 shows the configuration of memory chip 10 according to the present invention. Memory chip 10 consists of: I/Os divided into four blocks; memory arrays divided into four blocks (blocks A, B, C, and D); and address input parts divided into four blocks, to which an address in each block is sent. In this memory chip, each block has a storage capacity of 16 M and eight I/Os. More specifically, each block can be classified as a "2 Mbit, 81 I/O" structure. Therefore, twenty-one address lines are required to specify 2 M ($=2^{21}$) addresses. A time-shared row and column addressing scheme requires only half the number (i.e., 11) of address lines. Thus, 44 address lines for the four blocks are required.

In the preferred embodiment, the burst length is set to 8 bits. Unlike other conventional memory chips, in the present invention a 2-bit or a 4-bit burst length is not used for accessing data so that three bits become unnecessary in a column address, and only eighteen address input lines are required. If address data is received separately at the rising edge and at the falling edge of the clock signal, they can be received using half the number of address input lines of a conventional memory chip. Therefore, only five address input lines are required for each block. The total number of address input lines for four blocks is twenty.

In the preferred embodiment, an address can be specified in each block, in the I/Os, address inputs, and memory arrays, all of which are divided into blocks and function as independent memory chips. In each block, a row address and a column address are, preferably, separately specified. As shown in FIG. 1, a word line 16 is activated separately in each block to read address data 18 of a separate column address on the line 16.

Figure 2A:
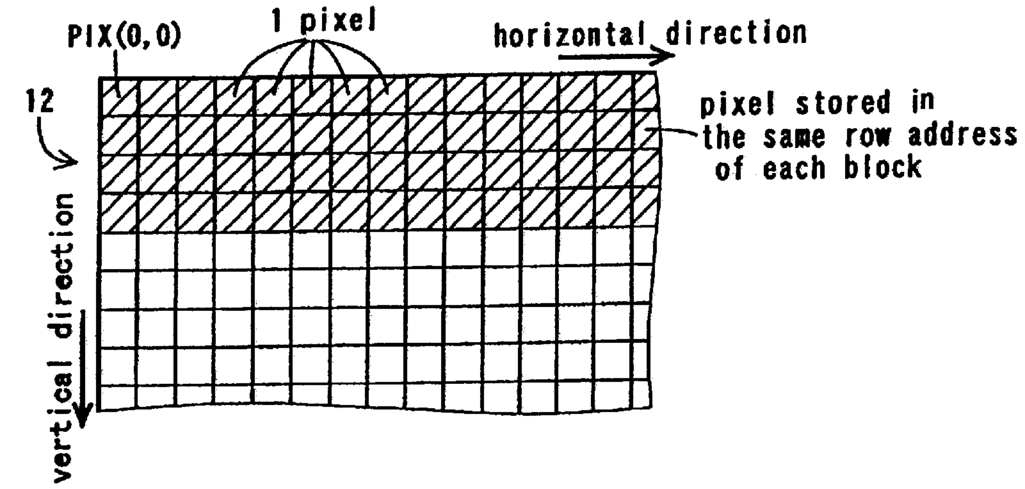
FIG. 2(*a*) is a diagram showing an example of a mapping of pixel data stored in the memory chip shown in FIG. 1 and an example of pixel data to be accessed, and FIG. 2(*b*) is a partially enlarged diagram of FIG. 2(*a*).
Figure 2B:
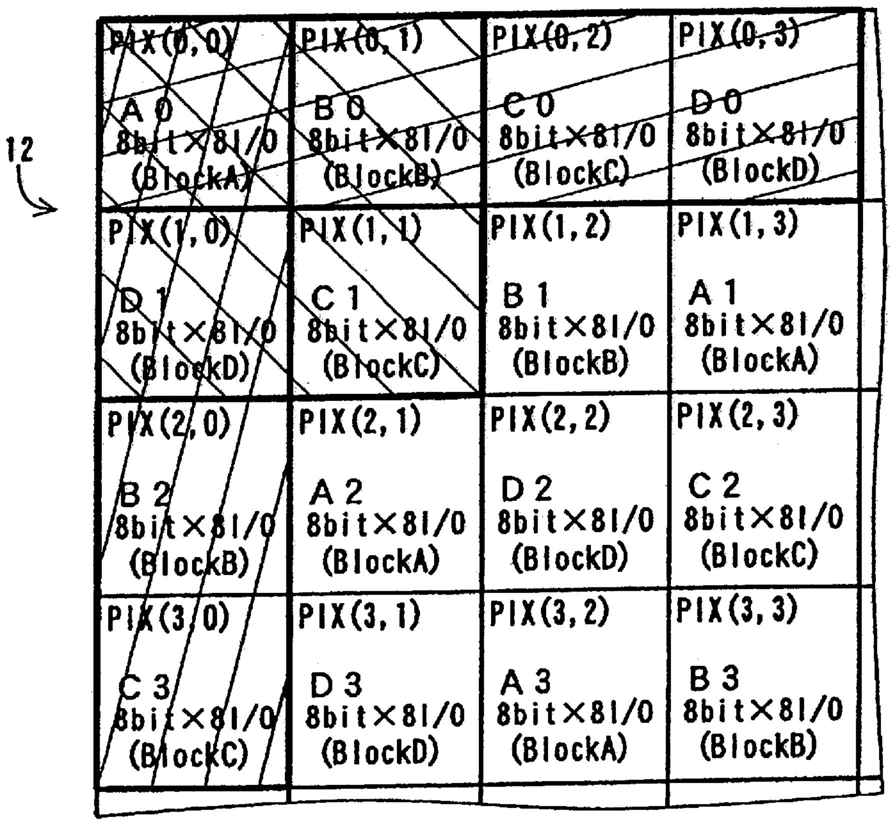
Figure 13A:
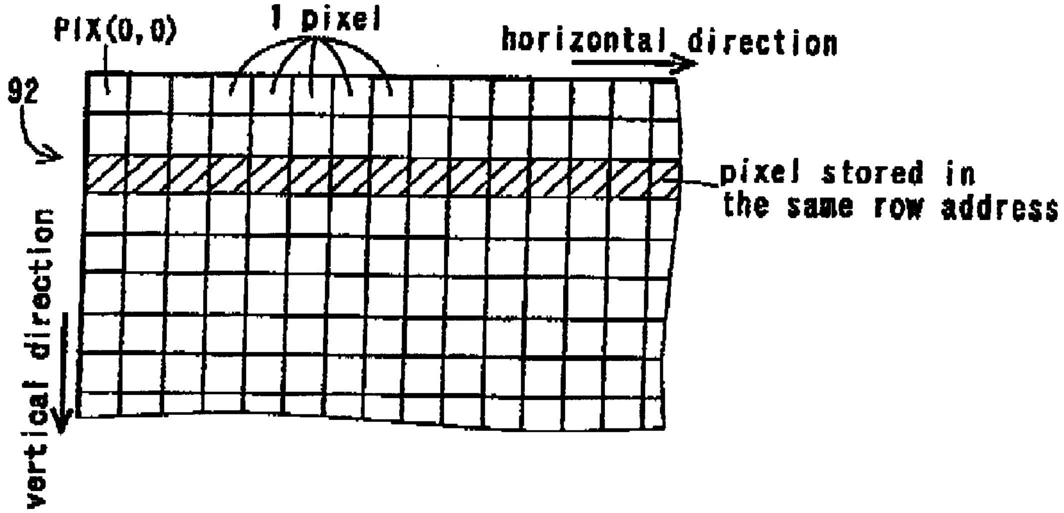
Fig. 13(a) (PRIOR ART)
FIG. 13(*a*) is a diagram showing an example of a mapping of pixel data stored in the memory chip shown in FIG. 12 and an example of pixel data to be accessed, and FIG. 13(*b*) is a partially enlarged diagram of FIG. 13(*a*).
Figure 13B:
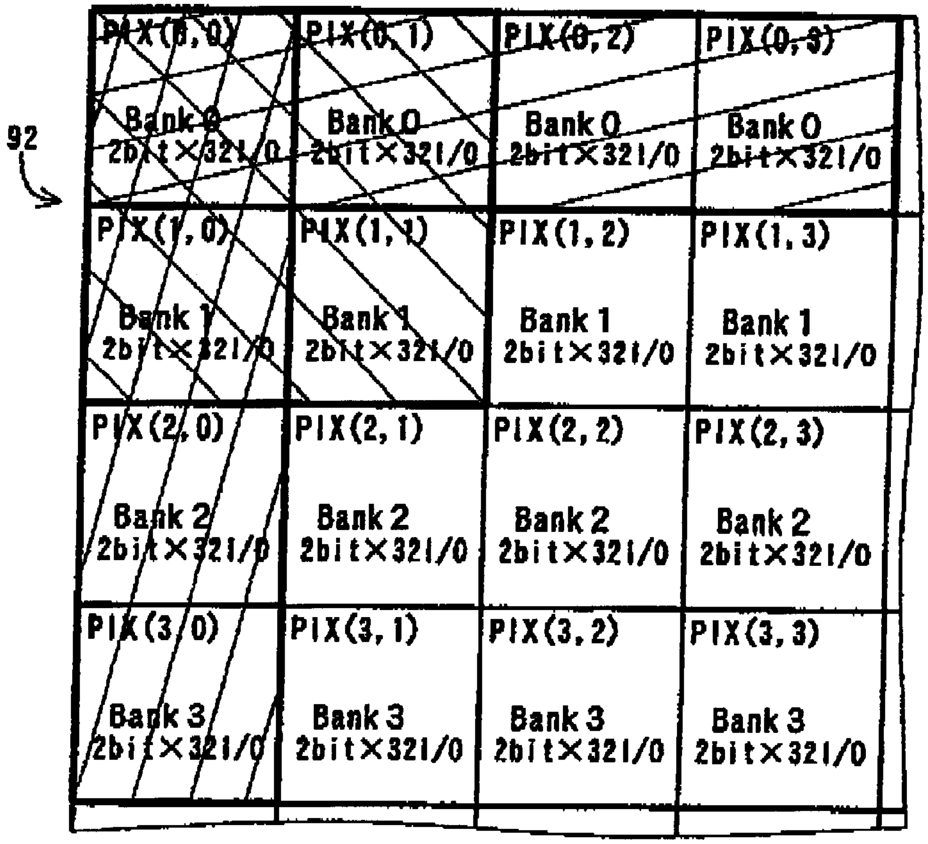
Fig. 13(b) (PRIOR ART)

FIGS. 2(*a*) and 2(*b*) illustrate the mapping of pixel data stored in memory chip 10. In the same manner as in a conventional mapping (as shown in FIGS. 13*a*–13*b*), PIX (m, n) represents the pixel of $m^{th}$ row from the top and $n^{th}$ column from the left of graphic image 12. Since data is stored in each block, pixel data is mapped such that four pixel data can be read four blocks at a time.

Referring to FIG. 2(*b*), pixel data of PIX (0, 0), PIX (0, 1), PIX (0, 2), and PIX (0, 3) are stored in blocks A, B, C, and D, respectively; PIX (1, 0), PIX (1, 1), PIX (1, 2), and PIX (1, 3) in blocks D, C, B, and A, respectively; PIX (2, 0), PIX (2, 1), PIX (2, 2), and PIX (2, 3) in blocks B, A, D and C, respectively; and PIX (3, 0), PIX (3, 1), PIX (3, 2), and PIX (3, 3) in blocks C, D, A and B, respectively. In this mapping, the data of four horizontal pixels is stored in four separate blocks. The data of four vertical pixels is also stored in four separate blocks, and the data of four diagonal pixels is also stored in four separate blocks. In addition, four pixel data consisting of a 2 by 2 square is also stored in four different blocks. In the four horizontal pixels shown by shaded lines in FIG. 2(*a*), pixel data allocated to the same block is stored in a same row address of each block. For instance, PIX (0, 0), PIX (1, 3), PIX (2, 1), and PIX (3, 2) are stored in the same row address of the block A. Such a mapping of pixel data is controlled by a memory controller (not shown).

Next, an embodiment of the memory chip and the method for storing data will be described with reading of the data taken as an example.

Figure 3A:
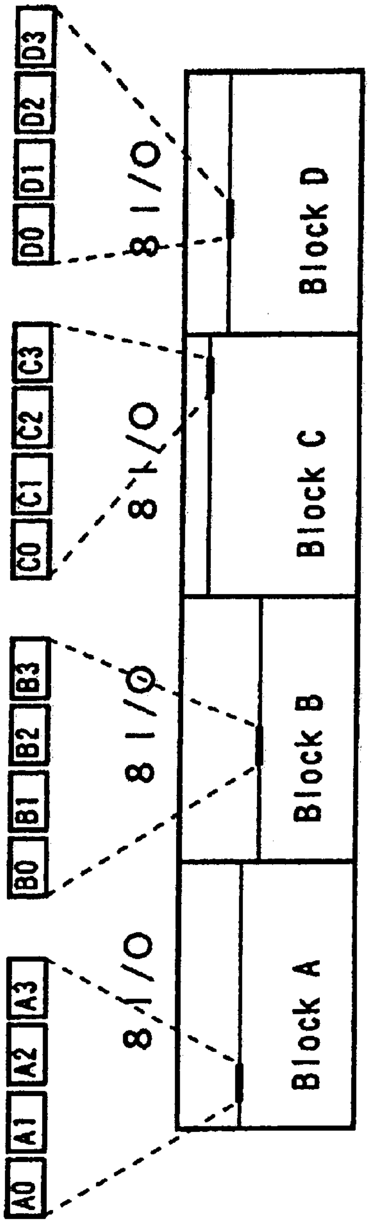
FIGS. 3(*a*) and 3(*c*) are diagrams showing data accesses in the memory chip shown in FIG. 1. Specifically, FIG. 3(*a*) is a schematic representation of data inputs and outputs between four 8 I/Os and four blocks, and FIGS. 3(*b*) and 3(*c*) are explanatory views showing the data accesses.
Figure 3B:
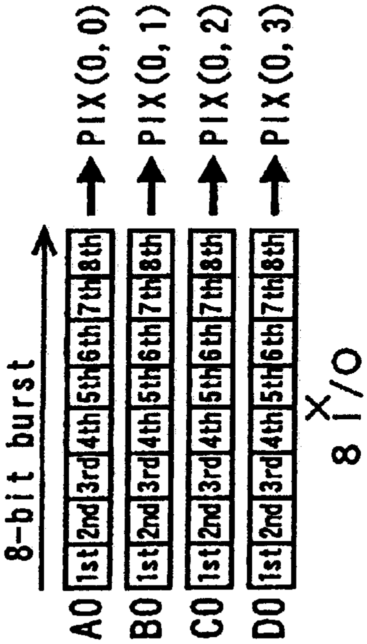
Figure 3C:
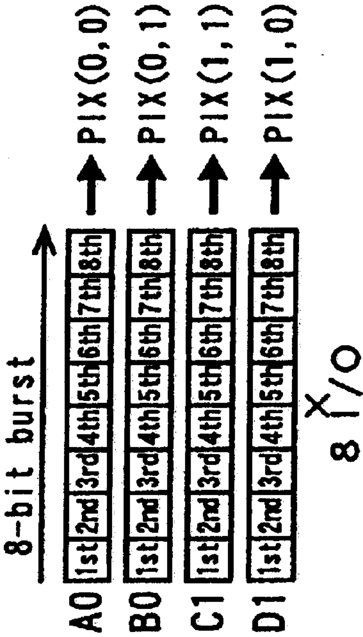

An 8-bit burst length is selected for bursts of data being read from each block. Since each block has eight I/Os, one pixel's data (64-bit data) can be read in a single burst operation. FIG. 3(*a*) is a schematic diagram of the data inputs and outputs of eight I/Os within in each block. A0 to D3 indicate an 8-bit burst of data. A0 to A3, B0 to B3, C0 to C3, and D0 to D3 indicate data in block A, block B, block C, and D, respectively. Likewise, A0, B0, C0, and D0 represent pixel data PIX (0, 0), PIX (0, 1), PIX (0, 2), and PIX (0, 3), respectively. A1, B1, C1, and D1 indicate pixel data PIX (1, 3), PIX (1, 2), PIX (1, 1), and PIX (1, 0), respectively. A2, B2, C2, and D2 indicate pixel data PIX (2, 1), PIX (2, 0), PIX (2, 3), and PIX (2, 2), respectively. A3, B3, C3, and D3 indicate pixel's data PIX (3, 2), PIX (3, 3), PIX (3, 0), and PIX (3, 1), respectively. When data of the four pixels in the top horizontal line shown in FIG. 2(*b*) is accessed, data A0 is read from block A to acquire pixel's data PIX (0, 0). In the same manner, data B0, C0, and D0 is read from blocks B, C, and D, respectively, to obtain pixel's data PIX (0, 1), PIX (0, 2), and PIX (0, 3), as shown in FIG. 3(*b*). The reading of the data for four pixel is conducted simultaneously. When data of four horizontal pixels in the scanning direction is accessed, it is read from respective blocks in a single 8-bit burst operation, so that high-speed reading can be achieved as in the case of a conventional reading. When data of the four pixels in a first vertical line from the left is accessed, data A0, B2, C3, and D1 is read at a time from the blocks A, B, C, and D as in the case of the four horizontal pixels. When data of the four vertical pixels is accessed, data is read from the respective blocks in a single 8-bit burst operation, so that it can be read at the same access speed as the data of horizontal pixels.

When data of the 2 by 2 square pixels shown in the upper left in FIG. 2(*b*) is accessed, data A0, B0, C1, and D1 is read from blocks A, B, C, and D in one 8-bit burst operation, as shown in FIG. 3(*c*). In this access, data is read from respective blocks in a single 8-bit operation, so that it can be read at the same access speed as the data of the horizontal pixels.

Figure 4:
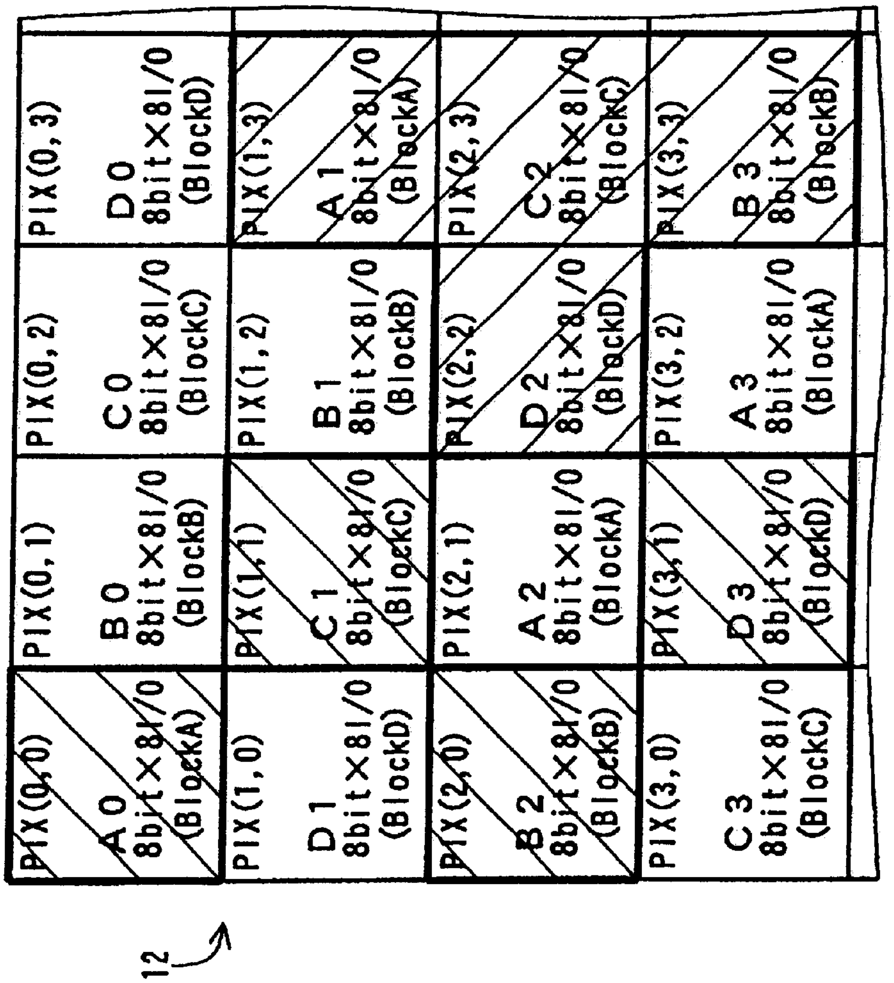
FIG. 4 is a diagram showing another example of the pixel data shown in FIGS. 2(*a*) and 2(*b*).
Figure 12:
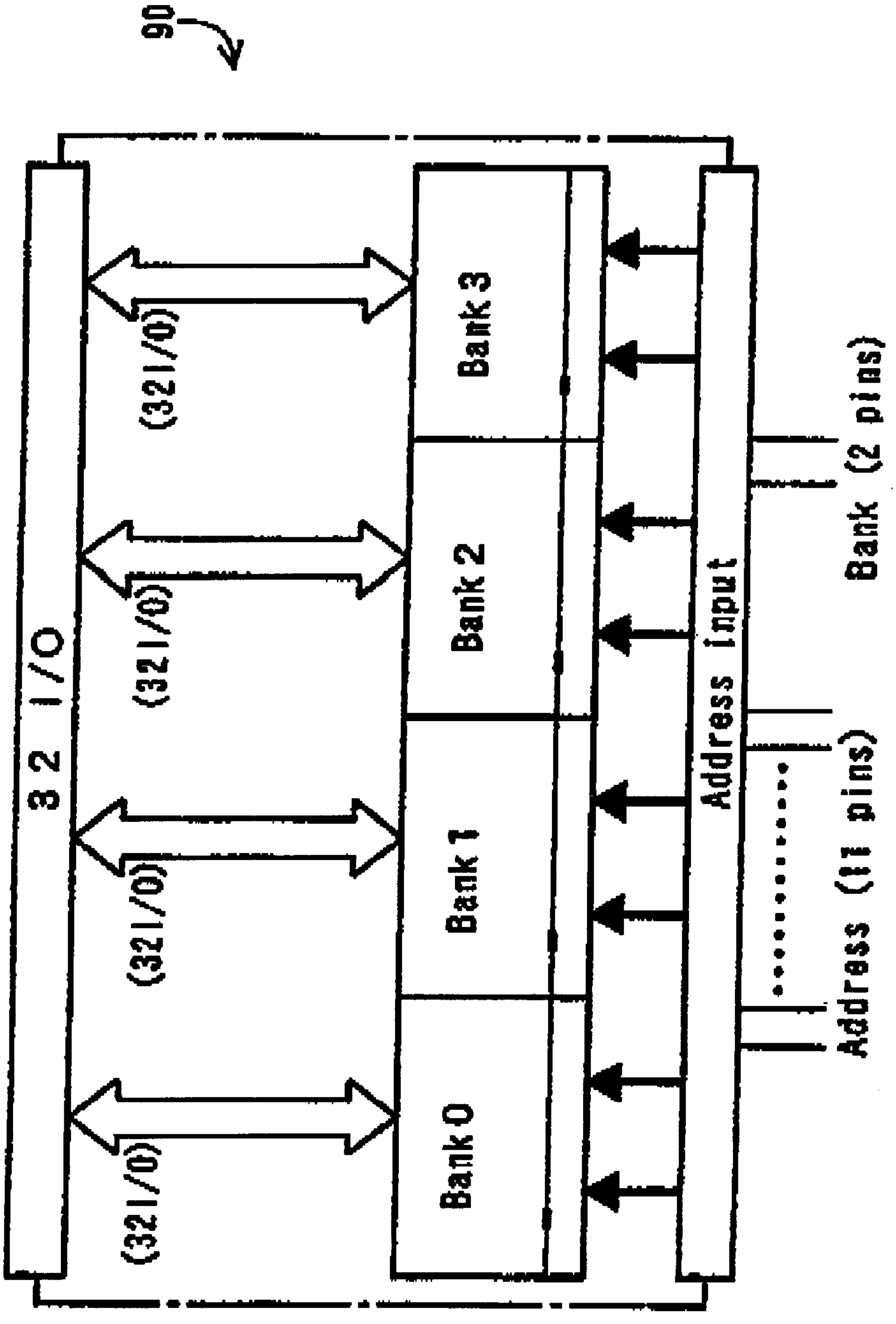
Fig. 12 (PRIOR ART)
FIG. 12 is a block diagram showing an example of a conventional memory chip organization.

Referring now to FIG. 4, when any four pixel data, e.g., data (A0, B2, C1, and D3) or data (A1, B3, C2, D2), is read from different blocks, only one 8-bit burst operation is required, which allows the same access speed as four horizontal pixels are read. Thus, in the memory chip of the present invention, data of any four pixels in a horizontal line, vertical line or diagonal line can be read in one 8-bit burst operation, since they are read from different blocks. This pixel data is arbitrarily mapped. Since there is no need to change the burst length, suspension of the data transmission does not occur. Inasmuch as one-pixel data is stored in each block, only one word line of 16 of one block is activated when one pixel's data is accessed. When comparing the present invention to the prior art wherein one pixel's data is read from four blocks, the number of word lines to be activated is reduced to one-quarter, thereby reducing power consumption by one-quarter. In the prior art shown in FIG. 12, since data is separately sent to thirty-two I/Os from respective banks, 128 signal lines cross each other in a complex arrangement. However, in the present invention as illustrated in FIG. 1, since data is sent to eight I/Os from each block, thirty-two signal lines are arranged without having to cross each other and, thus, a much simpler line arrangement can be realized.

Figure 14:
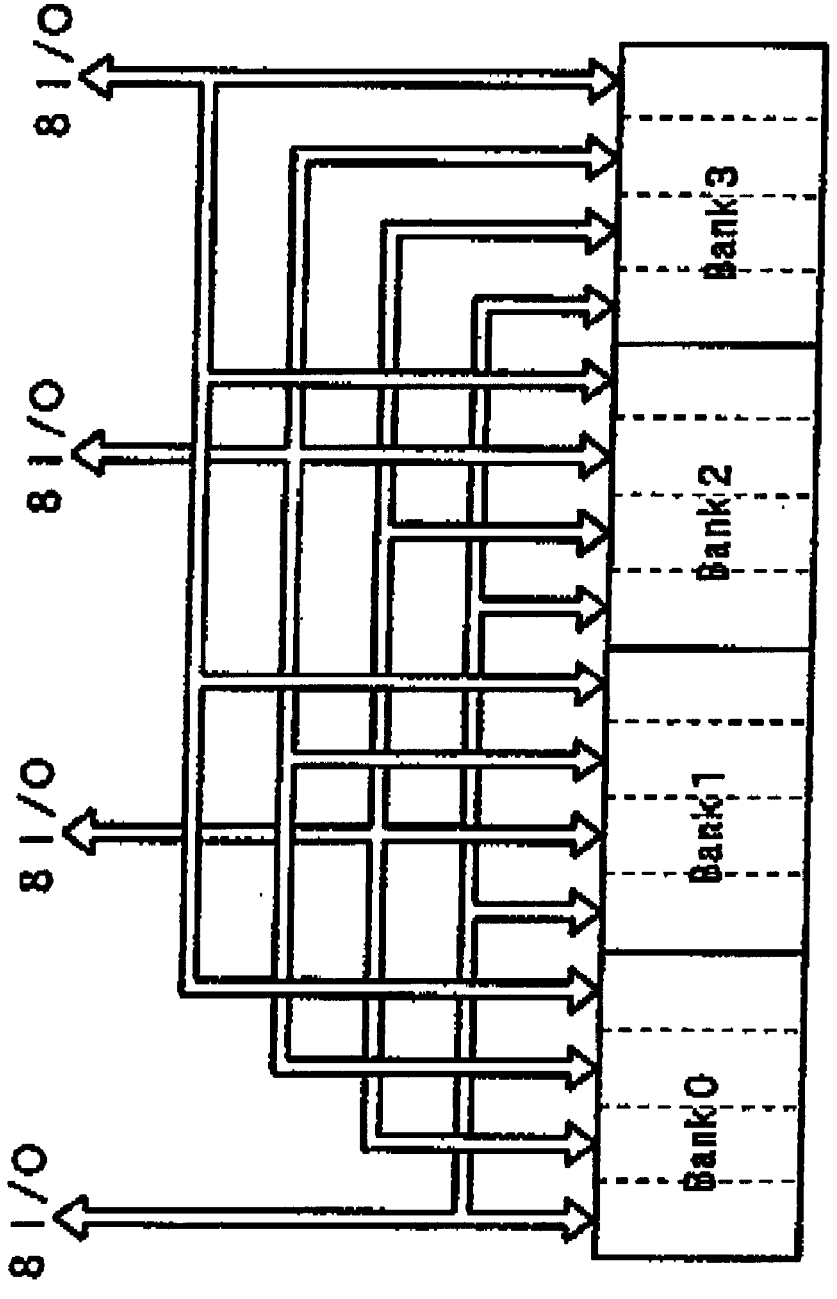
Fig. 14 (PRIOR ART)
FIG. 14 is a schematic representation showing the connections between four 8 I/Os and four banks in the memory chip shown in FIG. 12.
Figure 15A:
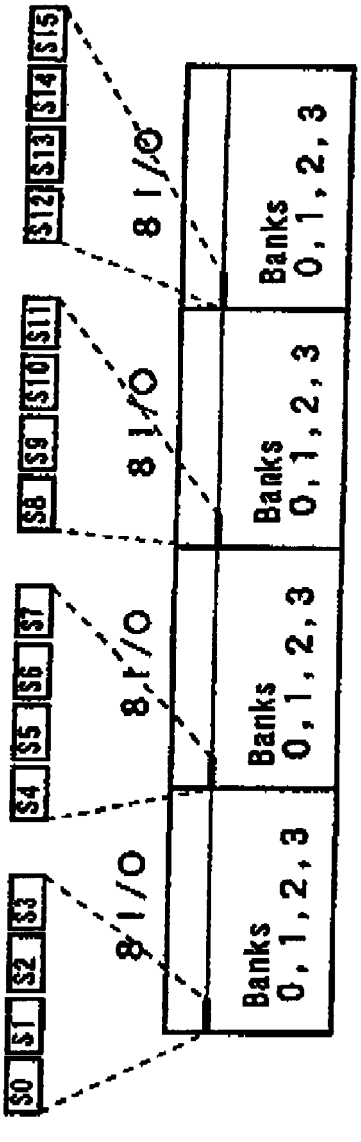
Fig. 15(a) (PRIOR ART)
FIGS. 15(*a*) to 15(*c*) are diagrams showing the data access in the memory chip shown in FIG. 12. Specifically, FIG. 15(*a*) is a conceptual representation of data inputs and outputs between four 8 I/Os and four blocks, and FIGS. 15(*b*) and 15(*c*) are explanatory views showing the access of data.
Figure 15B:
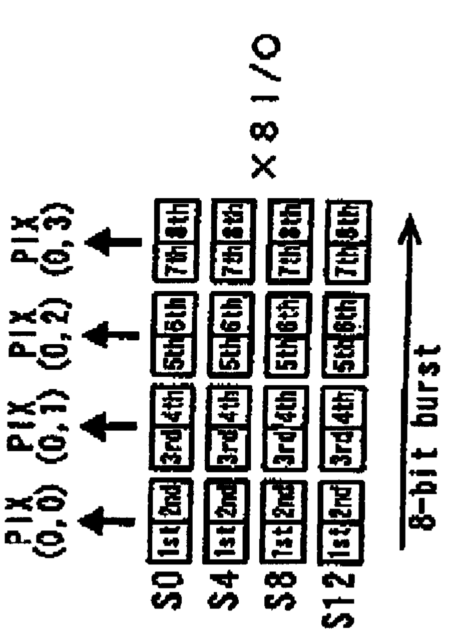
Fig. 15(b) (PRIOR ART)
Figure 15C:
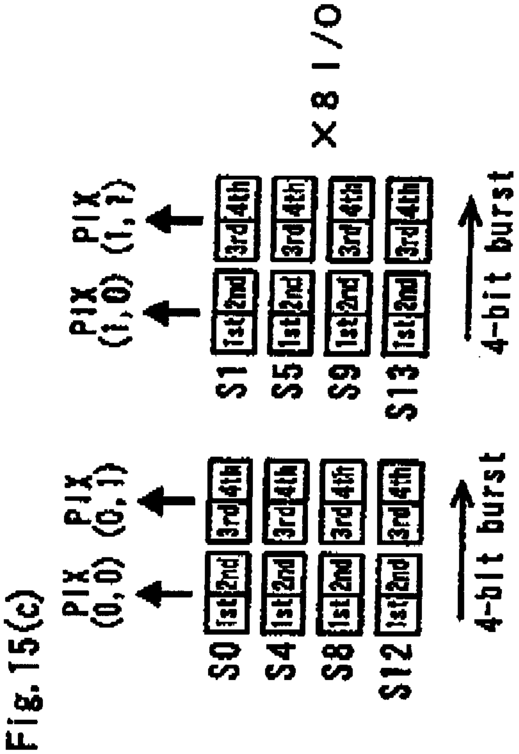

In the memory chip of the present invention, respective blocks including address inputs and data I/Os are substantially independent of each other. Furthermore, since the memory arrays are small and all the circuits that operate a memory are placed in close proximity of the memory arrays, no long address lines or data path lines are required. Therefore, a significant speedup of access time and cycle time in each block can be achieved. In the conventional memory chip shown in FIG. 14, address lines and data lines are almost as long as one side of the chip, too long to speed up the access time and the cycle time. However, as shown in FIG. 1, in the memory chip of four-block structure according to the present invention, address lines and data lines are one-fourth or less the length of equivalent lines in conventional memories.

The present invention can also be implemented using other configurations as well. By way of example, in the memory chip shown in FIG. 1, a row and a column addresses are specified separately in each block. However, it may also be possible that the same row address be designated in all the blocks and segments of a column address to be separately specified in the respective blocks. For example, as shown in FIG. 5, while the same row address (word line 26) is specified in all the blocks, a column segment 28 to be accessed can be separately designated in the respective blocks, using the lower two bits of the column address which upper bits are common to all the blocks.

Figure 5:
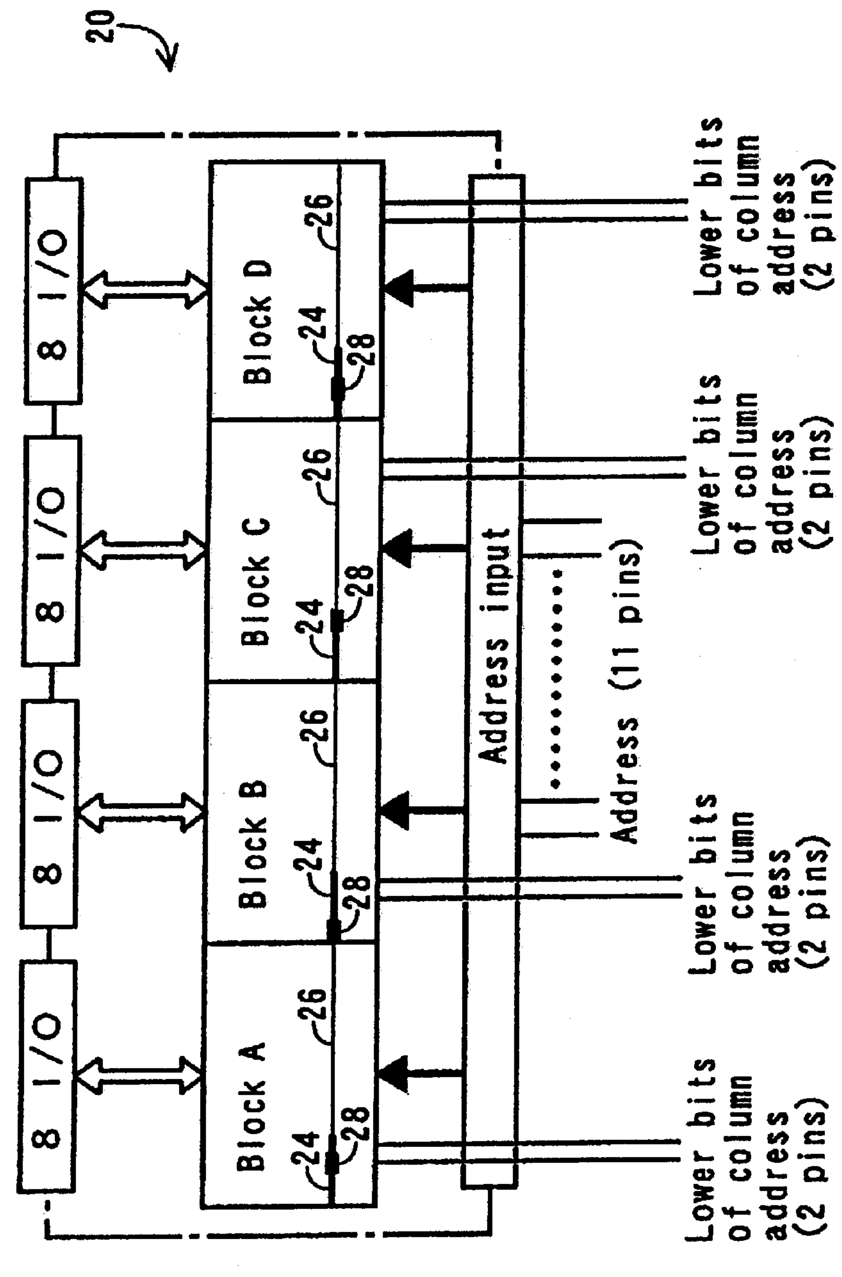
FIG. 5 is a block diagram showing another example of the memory chip organization according to the present invention.

In the memory chip shown in FIG. 5, a word line 26 in each block includes four column segments 24 corresponding to a specified column address. The memory chip 20 consists of eleven address input pins which receive row address and upper bits of column address common to all the blocks in a time-shared manner, and the lower two bits of column address which specify one segment 28 from four column segments 24 designated by the upper bits of column address. Thus, the lower two bits of column address sent to each block select one segment 28 from four segments 24 in each block. Thus, by specifying the row address and the upper bits of column address common to all the blocks, and by specifying selected segments of the column address separately in each block, the I/Os address the input lines and the memory arrays to operate as an independent memory entity within each block.

Figure 6:
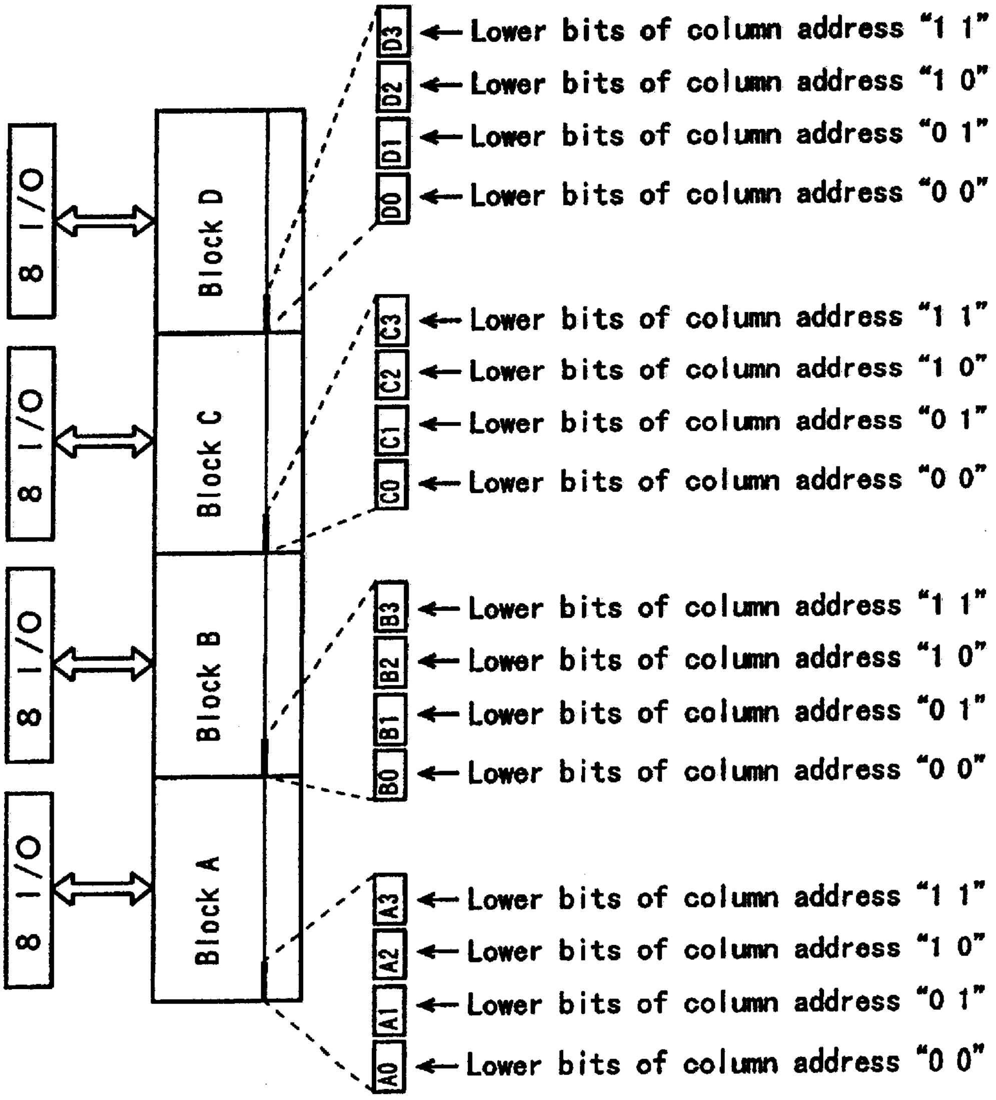
FIG. 6 is a block diagram showing column segments of the memory chip shown in FIG. 5.
Figure 7:
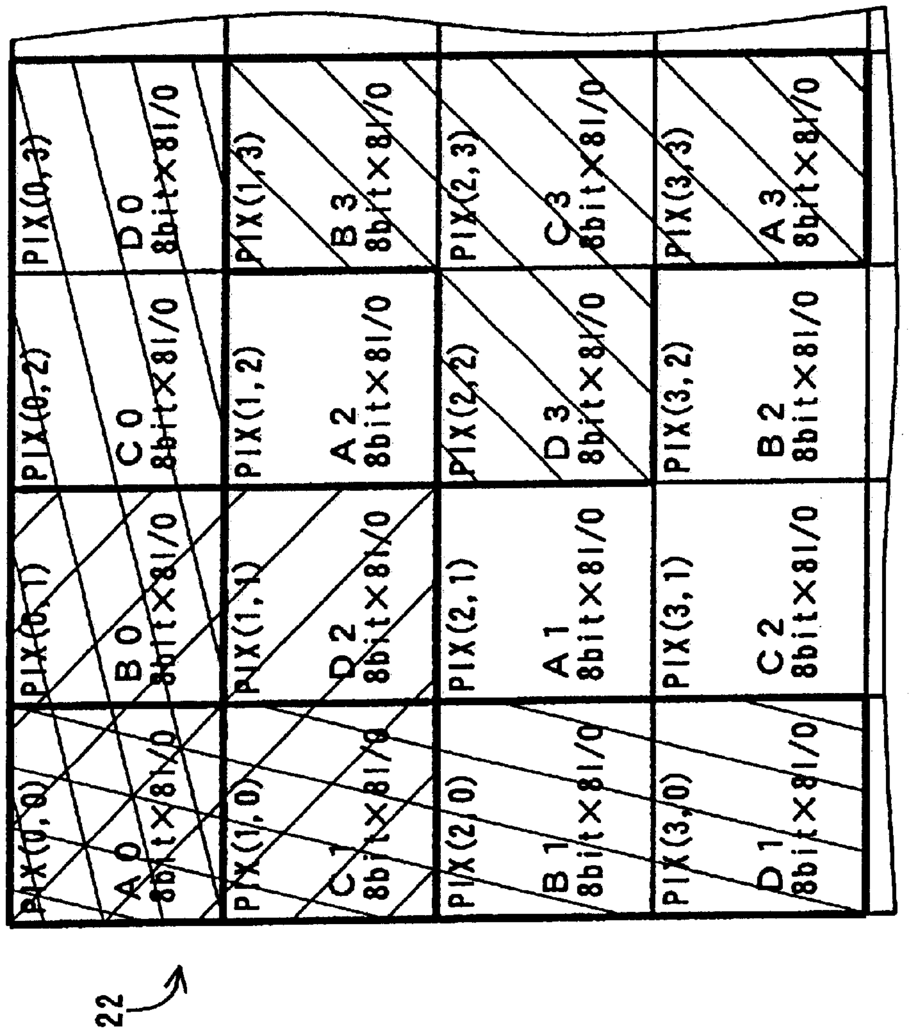
FIG. 7 is a diagram showing an example of the mapping of pixel data stored in the memory chip shown in FIG. 5 and an example of pixel data to be accessed.

FIG. 6 shows the column segments (A0 to D3) specified separately in respective blocks, and FIG. 7 shows an example of a mapping of pixel's data. Referring to FIG. 6 in more detail, A0 to D3 indicate an 8-bit burst of data. Specifically, A0, A1, A2, and A3 indicate pixel data of PIX(0, 0), PIX(2, 1), PIX(1, 2), and PIX(3, 3), respectively. B0, B1, B2, and B3 represent pixel data of PIX(0, 1), PIX(2, 0), PIX(3, 2), and PIX(1, 3), respectively, C0, C1, C2, and C3 represent pixel data of PIX(0, 2), PIX(1, 0), PIX(3, 1), and PIX(2, 3), respectively. D0, D1, D2, and D3 indicate pixel data of PIX(0, 3), PIX(3, 0), PIX(1, 1), and PIX(2, 2), respectively.

Still referring to FIG. 6, A0, B0, C0, and D0 are specified by the lower two bit '0 0' of the column address; A1, B1, C1, and D1 are specified by lower two bits '0 1'; A2, B2, C2, and D2, by lower two bits "1 0"; and A3, B3, C3, and D3 by lower two bits '1 1'.

In instances where data of four pixels in the top horizontal line shown in FIG. 7 is accessed, row address and upper bits of column address common to all the blocks are designated, and lower bits of column address are specified separately in each block. In a like manner, as it was shown in FIG. 3(*b*), pixel data A0, B0, C0, and D0 is read from blocks A, B, C, and D concurrently in a single 8-bit burst operation. Similarly, where data of four pixels in the first vertical line from the left is accessed, lower bits of column address are specified separately in each block, and data A0, B1, C1, and D1 is read from the blocks A, B, C, and D, respectively. As in the case of the memory chip 10 shown in FIG. 1, where pixel data is read from four different blocks, data is read in a single 8-bit burst operation at the same speed as horizontal pixel data is read.

Figure 8:
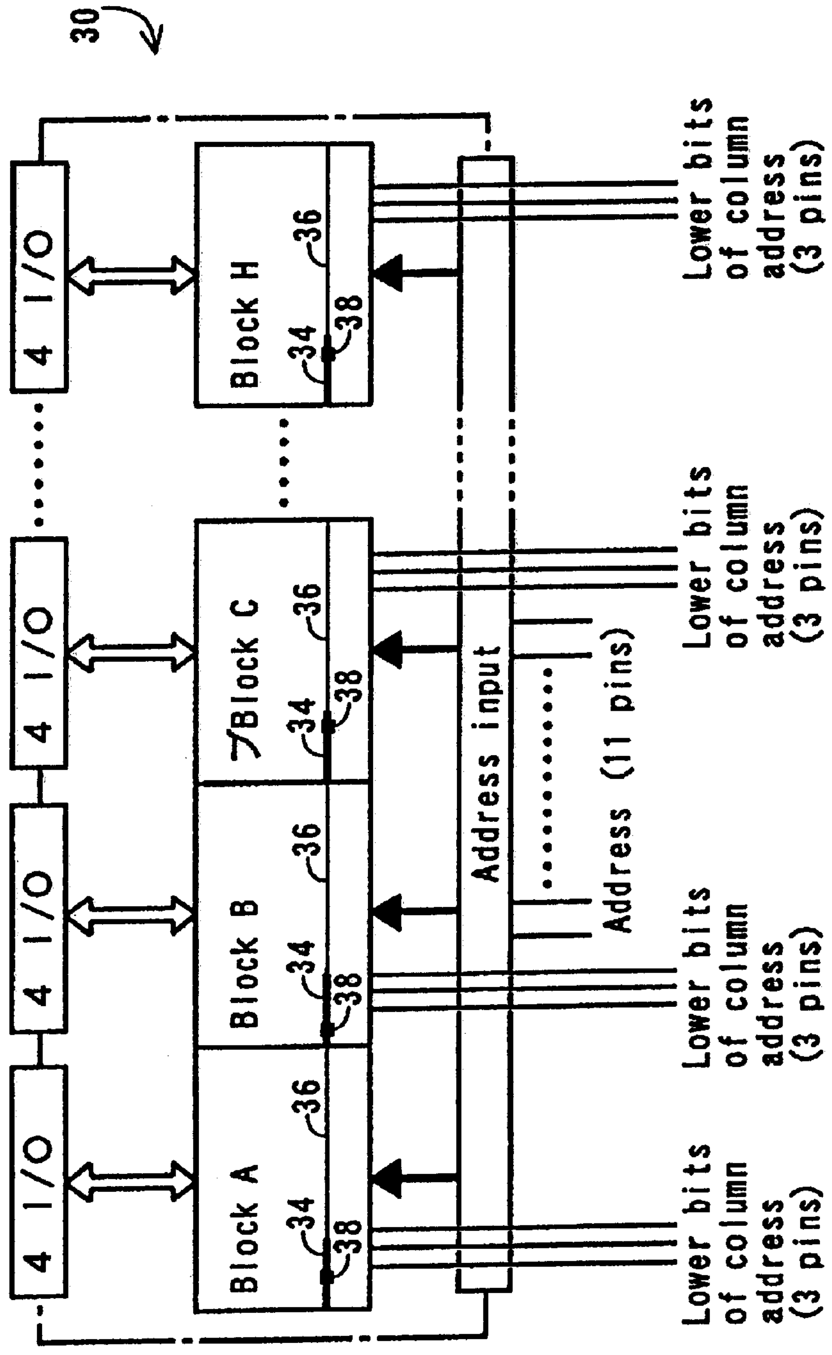
FIG. 8 is a block diagram showing still another example of the memory chip organization according to the present invention.
Figure 9:
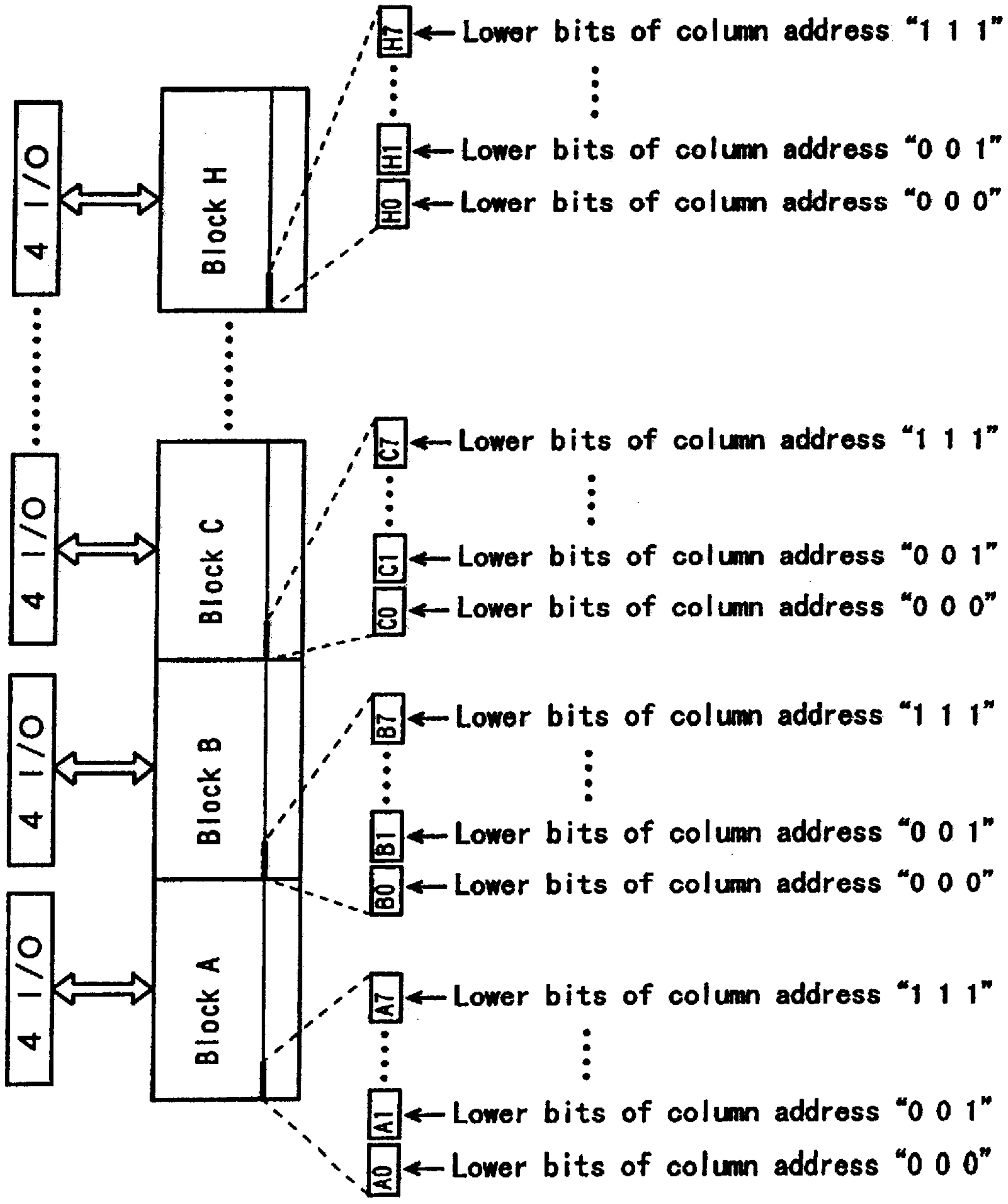
FIG. 9 is a block diagram showing column segments of the memory chip shown in FIG. 8.
Figure 10:
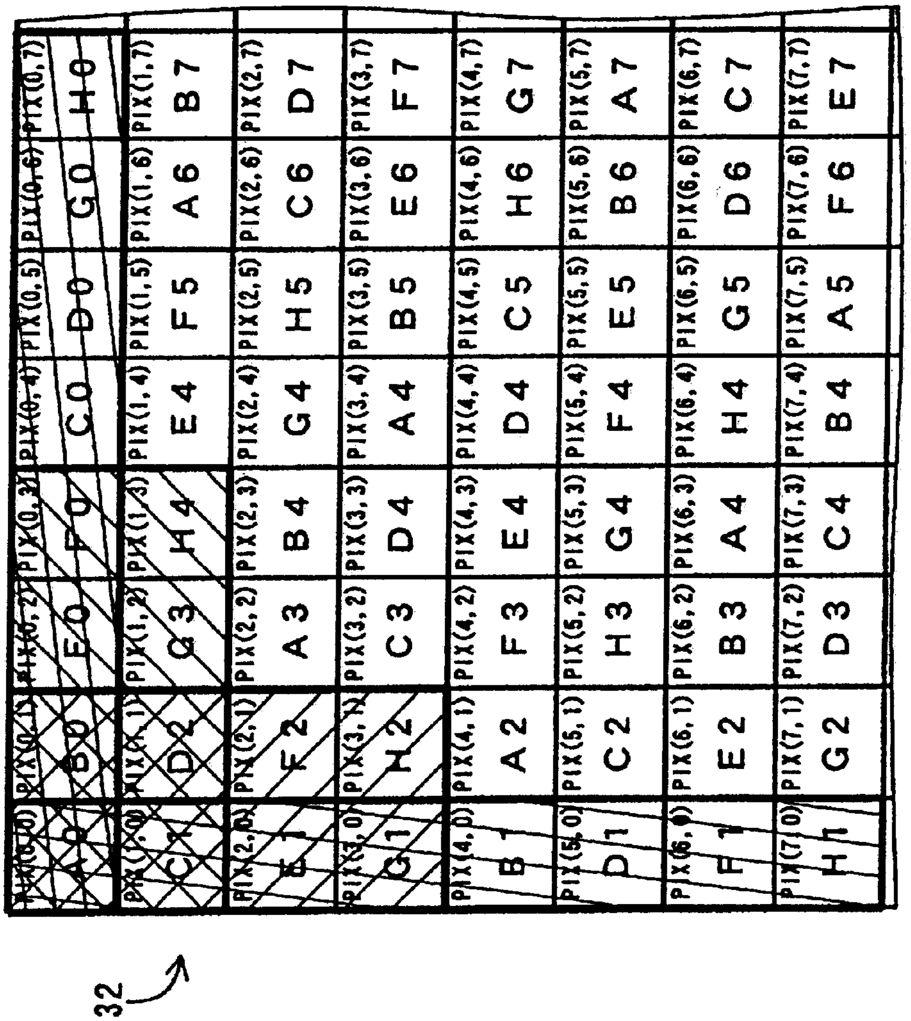
FIG. 10 is a diagram showing an example of a mapping of pixel data stored in the memory chip shown in FIG. 8 and an example of pixel data to be accessed.

Any number of blocks may include any number of I/Os. For example, in FIG. 8, thirty-two I/Os can be divided into eight blocks of four I/Os each. In the case where each block has four I/Os and each pixel consists of 64 bits, data is accessed in a 16-bit burst operation. Column segments of the memory chip and an example of a mapping of pixel data in this case is shown in FIG. 9 and FIG. 10, respectively. As shown in FIG. 9, each block receives a common row address (word line 36) and lower three bits of column address which select one segment 38 from eight segments 34 specified by upper bits of column address.

It is evident from the mapping shown in FIG. 10 that at least horizontal pixel data and vertical pixel data is stored in different blocks, respectively. As in the case of the memory chip of a four-block structure described above, pixel data to be read can be specified in each block by specifying lower bits of column address. Where pixel data is read from different blocks, all the data can be read at a time in a single 16-bit burst operation. Therefore, these data can be read at the same access speed as horizontal pixel data is read.

Figure 11:
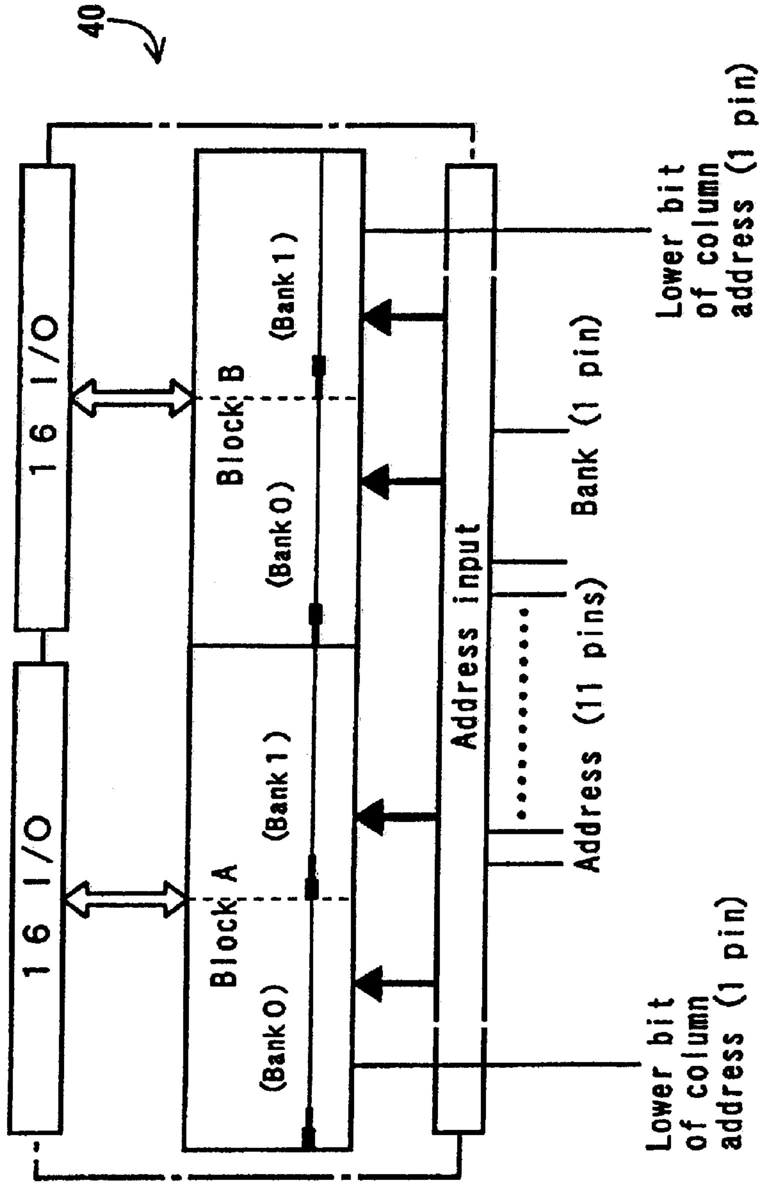
FIG. 11 is a block diagram showing a further example of the memory chip organization according to the present invention.

Referring to FIG. 11, the I/Os are arranged in a 2 by 16 block array. When each block has sixteen I/Os and one pixel consists of 64 bits, data is accessed in a 4-bit burst operation. In this case, it is preferable that each block includes banks (bank 0 and bank 1) so as to read data continuously.

Although specific embodiments of the present invention have thus been described, the present invention is not limited only to these. For example, in the case of a memory chip of an independent four-block structure, row address and column address are sent independently to the address pins in a time-shared manner and they are also sent separately at the rising edge and the falling edge of the clock signal, such that the required number of pins is reduced to one-half (i.e., about 20 pins) from the originally required number of the pins (i.e., about 40 pins). If the row address and the column address are sent separately to the pins in three installments, respectively (namely, they are sent in six installments), the required number of address pins can be farther reduced to twelve pins (three pins per block). Similarly, the memory chip of the present invention is not limited to a chip consisting of 4-blocks, but it can be arranged as a chip consisting of 2, 8 or 16 blocks. Such a memory chip of a multi-block structure can be achieved while a significant increase in the required number of the address pins is prevented, as in the case of the chip of a four-block structure. In as much as the size of the memory arrays decreases with the increasing number of blocks in a memory chip, the operating speed of the memory increases with a faster clock. When the memory operates on a faster clock, the amount of addresses sent to the address pins per hour increases. Thus, the number of times that addresses are sent can be increased without extending the number of the pins.

Whereas the invention has been described with reference to various preferred embodiments, those skilled in the art will readily realize that the invention can be implemented with any number of changes, modifications, and improvements, some of which have been previously mentioned, without departing from the scope of the appended claims.

What is claimed is:

1. A memory chip comprising a memory array comprising L memory blocks, each of said memory blocks being serviced by K inputs and outputs, wherein K and L are integers greater than 1;

means for mapping said memory array for storing continuously pixels of data in each of said plurality of memory blocks, wherein said data is M bits long, M being an integer greater than 1; and addressing means for specifying an address in each of said memory blocks to allow said pixel data stored in each of said memory blocks to be M bits long, said pixel data being read as continuous data by way of a burst having a length of N bits, where N=M×K.

2. The memory chip according to claim 1, wherein the burst length of N bits has a fixed number of bits.

3. The memory chip according to claim 1, wherein said continuous data represents pixel data, M bits thereof forming one pixel unit.

4. The memory according to claim 3, wherein said mapping means maps said memory array by having said data stored in different memory blocks per pixel unit.

5. The memory chip according to claim 1, wherein said addressing means specifies a row address common to said memory blocks and a column address, said column address varying from one memory block to the next.

6. The memory chip according to claim 1, wherein said addressing means specifies a common high-order bit and two different low-order bits of a column address for each memory block.

* * * * *